United States Patent [19]
Lent et al.

[11] Patent Number: 5,611,054
[45] Date of Patent: Mar. 11, 1997

[54] METHOD AND APPARATUS FOR DECODING AND RECODING OF ADDRESSES

[75] Inventors: David D. Lent, Placerville; Daniel J. Dunn, Roseville, both of Calif.

[73] Assignee: Intel Corporation, Santa Clara, Calif.

[21] Appl. No.: 567,405

[22] Filed: Dec. 5, 1995

Related U.S. Application Data

[63] Continuation of Ser. No. 210,346, Mar. 18, 1994, abandoned.

[51] Int. Cl.⁶ ................................................. G06F 13/00
[52] U.S. Cl. ................................... 395/280; 395/412
[58] Field of Search .................... 395/280, 420, 395/421.02, 412

[56] References Cited

U.S. PATENT DOCUMENTS

| | | | |
|---|---|---|---|
| 4,481,579 | 11/1984 | Kinghorn | 364/200 |
| 4,695,948 | 9/1987 | Blevins et al. | 364/200 |
| 5,261,073 | 11/1993 | Mann | 395/425 |
| 5,271,098 | 12/1993 | Khan et al. | 395/400 |
| 5,390,336 | 2/1995 | Hillis | 395/800 |
| 5,416,499 | 5/1995 | Ohtsu | 345/189 |

*Primary Examiner*—Jack B. Harvey
*Assistant Examiner*—John Travis
*Attorney, Agent, or Firm*—Blakely, Sokoloff, Taylor & Zafman

[57] ABSTRACT

A semiconductor component is described which directs transmission of data. The component comprises of a decoder device coupled to said first memory device capable of decoding an address of said data in said first format using said stored address in said first memory device. The component also comprises a translator device coupled to said second memory device capable of transmitting said address of said data in said second format corresponding to said address of said data in said first format, wherein the second format contains the same amount of information as the first format.

9 Claims, 23 Drawing Sheets

PACKET 1 C1

| BIT | 15 | 14 | 13 | 12 | 11 | 10 | 9 | 8 |
|---|---|---|---|---|---|---|---|---|
| ENABLE | 1 | 0 | 1 | W/R# | NMI | PIC | T0 | DMAR |

| BIT | 7 | 6 | 5 | 4 | 3 | 2 | 1 | 0 |
|---|---|---|---|---|---|---|---|---|
| ENABLE | DMA4 | DMA0 | RESERVED | WIO | XBUS | ISATIM | IDESEV | PIRQ |

PACKET 2 C2

| BIT | 15 | 14 | 13 | 12 | 11 | 10 | 9 | 8 |
|---|---|---|---|---|---|---|---|---|
| ENABLE | BE3# | BE2# | BE1# | BE0# | MEMH | SMI | SEE | FOT |

| BIT | 7 | 6 | 5 | 4 | 3 | 2 | 1 | 0 |
|---|---|---|---|---|---|---|---|---|
| ENABLE | STPCLK | TRC | A7 | A6 | A5 | A4 | A3 | A2 |

PACKET 3 D1

| BIT | 15 | 14 | 13 | 12 | 11 | 10 | 9 | 8 |
|---|---|---|---|---|---|---|---|---|
| ENABLE | D15 | D14 | D13 | D12 | D11 | D10 | D9 | D8 |

| BIT | 7 | 6 | 5 | 4 | 3 | 2 | 1 | 0 |
|---|---|---|---|---|---|---|---|---|
| ENABLE | D7 | D6 | D5 | D4 | D3 | D2 | D1 | D0 |

PACKET 4 D2

| BIT | 15 | 14 | 13 | 12 | 11 | 10 | 9 | 8 |
|---|---|---|---|---|---|---|---|---|
| ENABLE | D31 | D30 | D29 | D28 | D27 | D26 | D25 | D24 |

| BIT | 7 | 6 | 5 | 4 | 3 | 2 | 1 | 0 |
|---|---|---|---|---|---|---|---|---|
| ENABLE | D23 | D22 | D21 | D20 | D19 | D18 | D17 | D16 |

PACKET 5 GO/ABORT

| BIT | 15 | 14 | 13 | 12 | 11 | 10 | 9 | 8 |
|---|---|---|---|---|---|---|---|---|
| ENABLE | GO/ABORT | GO/ABORT | GO/ABORT | GO/ABORT | RESERVED | RESERVED | RESERVED | RESERVED |

| BIT | 7 | 6 | 5 | 4 | 3 | 2 | 1 | 0 |
|---|---|---|---|---|---|---|---|---|
| ENABLE | RESERVED | RESERVED | RESERVED | RESERVED | RESERVED | RESERVED | RESERVED | RESERVED |

FIGURE 4

| ADDRESS | ADDRESS | | | | TYPE | NAME | BUS MASTER | LINK CODING |
|---|---|---|---|---|---|---|---|---|
| | FEDC | BA98 | 7654 | 3210 | | | | |
| 0000h | 0000 | 0000 | 000x | 0000 | r/w | DMA1 CH0 BASE AND CURRENT ADDRESS | CPU/PCI | DMA0=1 |
| 0001h | 0000 | 0000 | 000x | 0001 | r/w | DMA1 CH0 BASE AND CURRENT COUNT | CPU/PCI | DMA0=1 |
| 0002h | 0000 | 0000 | 000x | 0010 | r/w | DMA1 CH1 BASE AND CURRENT ADDRESS | CPU/PCI | DMA0=1 |
| 0003h | 0000 | 0000 | 000x | 0011 | r/w | DMA1 CH1 BASE AND CURRENT COUNT | CPU/PCI | DMA0=1 |
| 0004h | 0000 | 0000 | 000x | 0100 | r/w | DMA1 CH2 BASE AND CURRENT ADDRESS | CPU/PCI | DMA0=1 |
| 0005h | 0000 | 0000 | 000x | 0101 | r/w | DMA1 CH2 BASE AND CURRENT COUNT | CPU/PCI | DMA0=1 |
| 0006h | 0000 | 0000 | 000x | 0110 | r/w | DMA1 CH3 BASE AND CURRENT ADDRESS | CPU/PCI | DMA0=1 |
| 0007h | 0000 | 0000 | 000x | 0111 | r/w | DMA1 CH3 BASE AND CURRENT COUNT | CPU/PCI | DMA0=1 |
| 0008h | 0000 | 0000 | 000x | 1000 | r/w | DMA1 STATUS(r) COMMAND(w) REGISTER | CPU/PCI | DMA0=1 |
| 0009h | 0000 | 0000 | 000x | 1001 | wo | DMA1 WRITE REQUEST REGISTER | CPU/PCI | DMA0=1 |
| 000Ah | 0000 | 0000 | 000x | 1010 | wo | DMA1 WRITE SINGLE MASK BIT | CPU/PCI | DMA0=1 |
| 000Bh | 0000 | 0000 | 000x | 1011 | wo | DMA1 WRITE MODE REGISTER | CPU/PCI | DMA0=1 |

FIGURE 5A

| ADDRESS | ADDRESS FEDC | ADDRESS BA98 | ADDRESS 7654 | ADDRESS 3210 | TYPE | NAME | BUS MASTER | LINK CODING |
|---|---|---|---|---|---|---|---|---|
| 000Ch | 0000 | 0000 | 000x | 1100 | wo | DMA1 CLEAR BYTE POINTER | CPU/PCI | DMA0=1 |
| 000Dh | 0000 | 0000 | 000x | 1101 | wo | DMA1 MASTER CLEAR | CPU/PCI | DMA0=1 |
| 000Eh | 0000 | 0000 | 000x | 1110 | wo | DMA1 CLEAR MASK REGISTER | CPU/PCI | DMA0=1 |
| 000Fh | 0000 | 0000 | 000x | 1111 | r/w | DMA1 READ/WRITE ALL MASK REGISTER BITS | CPU/PCI | DMA0=1 |
| 0020h | 0000 | 0000 | 001x | xx00 | r/w | INT 1 CONTROL REGISTER | CPU/PCI/ISA | PIC=1 |
| 0021h | 0000 | 0000 | 001x | xx01 | r/w | INT 1 MASK REGISTER | CPU/PCI/ISA | PIC=1 |
| 0040h | 0000 | 0000 | 010x | 0000 | r/w | TIMER COUNTER 1 - COUNTER 0 COUNT | CPU/PCI/ISA | T0=1 |
| 0041h | 0000 | 0000 | 010x | 0001 | r/w | TIMER COUNTER 1 - COUNTER 1 COUNT | CPU/PCI/ISA | T0=1 |
| 0042h | 0000 | 0000 | 010x | 0010 | r/w | TIMER COUNTER 1 - COUNTER 2 COUNT | CPU/PCI/ISA | T0=1 |
| 0043h | 0000 | 0000 | 010x | 0011 | wo | TIMER COUNTER 1 COMMAND MODE REGISTER | CPU/PCI/ISA | T0=1 |
| 0060h[1] | 0000 | 0000 | 0110 | 00x0 | r | RESET X BUS IRQ12/M AND IRQ1 | CPU/PCI/ISA | XBUS=1 |
| 0061h | 0000 | 0000 | 0110 | 0XX1 | r/w | NMI STATUS AND CONTROL | CPU/PCI/ISA | T0=1 |

FIGURE 5B

| ADDRESS | ADDRESS FEDC | ADDRESS BA98 | ADDRESS 7654 | ADDRESS 3210 | TYPE | NAME | BUS MASTER | LINK CODING |
|---|---|---|---|---|---|---|---|---|
| 0070h[1] | 0000 | 0000 | 0111 | 0xx0 | wo | CMOS RAM ADDRESS AND NMI MASK REG. | CPU/PCI/ISA | NMI=1 |
| 0080h[3] | 0000 | 0000 | 100x | 0000 | r/w | DMA PAGE REGISTER (RESERVED) | CPU/PCI/ISA | DMAR=1 |
| 0081h | 0000 | 0000 | 100x | 0001 | r/w | DMA CHANNEL 2 PAGE REGISTER | CPU/PCI/ISA | DMA0=1 |
| 0082h | 0000 | 0000 | 1000 | 0010 | r/w | DMA CHANNEL 3 PAGE REGISTER | CPU/PCI/ISA | DMA0=1 |
| 0083h | 0000 | 0000 | 100x | 0011 | r/w | DMA CHANNEL 1 PAGE REGISTER | CPU/PCI/ISA | DMA0=1 |
| 0084h[3] | 0000 | 0000 | 100x | 0100 | r/w | DMA PAGE REGISTER (RESERVED) | CPU/PCI/ISA | DMAR=1 |
| 0085h[3] | 0000 | 0000 | 100x | 0101 | r/w | DMA PAGE REGISTER (RESERVED) | CPU/PCI/ISA | DMAR=1 |
| 0086h[3] | 0000 | 0000 | 100x | 0110 | r/w | DMA PAGE REGISTER (RESERVED) | CPU/PCI/ISA | DMAR=1 |
| 0087h | 0000 | 0000 | 100x | 0111 | r/w | DMA CHANNEL 0 PAGE REGISTER | CPU/PCI/ISA | DMA0=1 |
| 0088h[3] | 0000 | 0000 | 100x | 0100 | r/w | DMA PAGE REGISTER (RESERVED) | CPU/PCI/ISA | DMAR=1 |
| 0089h | 0000 | 0000 | 100x | 1001 | r/w | DMA CHANNEL 6 PAGE REGISTER | CPU/PCI/ISA | DMA0=1 |
| 008Ah | 0000 | 0000 | 100x | 1010 | r/w | DMA CHANNEL 7 PAGE REGISTER | CPU/PCI/ISA | DMA0=1 |

FIGURE 5C

| ADDRESS | ADDRESS | | | | TYPE | NAME | BUS MASTER | LINK CODING |
|---|---|---|---|---|---|---|---|---|
| | FEDC | BA98 | 7654 | 3210 | | | | |
| 008Bh | 0000 | 0000 | 100x | 1011 | r/w | DMA CHANNEL 5 PAGE REGISTER | CPU/PCI/ISA | DMA0=1 |
| 008Ch[3] | 0000 | 0000 | 100x | 1100 | r/w | DMA PAGE REGISTER (RESERVED) | CPU/PCI/ISA | DMAR=1 |
| 008Dh[3] | 0000 | 0000 | 100x | 1101 | r/w | DMA PAGE REGISTER (RESERVED) | CPU/PCI/ISA | DMAR=1 |
| 008Eh[3] | 0000 | 0000 | 100x | 1110 | r/w | DMA PAGE REGISTER (RESERVED) | CPU/PCI/ISA | DMAR=1 |
| 008Fh | 0000 | 0000 | 100x | 1111 | r/w | DMA LOW PAGE REGISTER REFRESH | CPU/PCI/ISA | DMA0=1 |
| 00A0h | 0000 | 0000 | 101x | xx00 | r/w | INT 2 CONTROL REGISTER | CPU/PCI/ISA | PIC=1 |
| 00A1h | 0000 | 0000 | 101x | xx01 | r/w | INT 2 MASK REGISTER | CPU/PCI/ISA | PIC=1 |
| 00B2h[5] | 0000 | 0000 | 1011 | 0010 | r/w | ADVANCED POWER MANAGEMENT CONTROL PORT | CPU | WIO=1 |
| 00B3h | 0000 | 0000 | 1011 | 0011 | r/w | ADVANCED POWER MANAGMENT STATUS PORT | CPU/PCI | WIO=1 |
| 00C0h | 0000 | 0000 | 1100 | 000x | r/w | DMA2 CH0 BASE AND CURRENT ADDRESS | CPU/PCI | DMA0=1 |
| 00C2h | 0000 | 0000 | 1100 | 001x | r/w | DMA2 CH0 BASE AND CURRENT COUNT | CPU/PCI | DMA0=1 |
| 00C4h | 0000 | 0000 | 1100 | 010x | r/w | DMA2 CH0 BASE AND CURRENT ADDRESS | CPU/PCI | DMA0=1 |

FIGURE 5D

| ADDRESS | ADDRESS | | | | TYPE | NAME | BUS MASTER | LINK CODING |
|---|---|---|---|---|---|---|---|---|
| | FEDC | BA98 | 7654 | 3210 | | | | |
| 00C6h | 0000 | 0000 | 1100 | 011x | r/w | DMA2 CH1 BASE AND CURRENT COUNT | CPU/PCI | DMA0=1 |
| 00C8h | 0000 | 0000 | 1100 | 100x | r/w | DMA2 CH2 BASE AND CURRENT ADDRESS | CPU/PCI | DMA0=1 |
| 00CAh | 0000 | 0000 | 1100 | 101x | r/w | DMA2 CH2 BASE AND CURRENT COUNT | CPU/PCI | DMA0=1 |
| 00CCh | 0000 | 0000 | 1100 | 110x | r/w | DMA2 CH3 BASE AND CURRENT ADDRESS | CPU/PCI | DMA0=1 |
| 00CEh | 0000 | 0000 | 1100 | 111x | r/w | DMA2 CH3 BASE AND CURRENT COUNT | CPU/PCI | DMA0=1 |
| 00D0h | 0000 | 0000 | 1101 | 000x | r/w | DMA2 STATUS(r) COMMAND(w) REGISTER | CPU/PCI | DMA0=1 |
| 00D2h | 0000 | 0000 | 1101 | 001x | wo | DMA2 WRITE REQUEST REGISTER | CPU/PCI | DMA0=1 |
| 00D4h | 0000 | 0000 | 1101 | 010x | wo | DMA2 WRITE SINGLE MASK BIT | CPU/PCI | DMA0=1 |
| 00D6h | 0000 | 0000 | 1101 | 011x | wo | DMA2 WRITE MODE REGISTER | CPU/PCI | DMA0=1 |
| 00D8h | 0000 | 0000 | 1101 | 100x | wo | DMA2 CLEAR BYTE POINTER | CPU/PCI | DMA0=1 |
| 00DAh | 0000 | 0000 | 1101 | 101x | wo | DMA2 MASTER CLEAR | CPU/PCI | DMA0=1 |
| 00DCh | 0000 | 0000 | 1101 | 110x | wo | DMA2 CLEAR MASK REGISTER | CPU/PCI | DMA0=1 |

FIGURE 5E

| ADDRESS | ADDRESS | | | | TYPE | NAME | BUS MASTER | LINK CODING |
|---|---|---|---|---|---|---|---|---|
| | FEDC | BA98 | 7654 | 3210 | | | | |
| 00DEh | 0000 | 0000 | 1101 | 111x | r/w | DMA2 READ/WRITE ALL MASK REGISTER BITS | CPU/PCI | DMA0=1 |
| 00F0h[1] | 0000 | 0000 | 1111 | 0000 | wo | COPROCESSOR ERROR | CPU/PCI/ISA | XBUS=1 |
| 0481h | 0000 | 0100 | 1000 | 0001 | r/w | DMA CH2 HIGH PAGE REGISTER | CPU/PCI/ISA | DMA4=1 |
| 0482h | 0000 | 0100 | 1000 | 0010 | r/w | DMA CH3 HIGH PAGE REGISTER | CPU/PCI/ISA | DMA4=1 |
| 0483h | 0000 | 0100 | 1000 | 0011 | r/w | DMA CH1 HIGH PAGE REGISTER | CPU/PCI/ISA | DMA4=1 |
| 0487h | 0000 | 0100 | 1000 | 0111 | r/w | DMA CH0 HIGH PAGE REGISTER | CPU/PCI/ISA | DMA4=1 |
| 0489h | 0000 | 0100 | 1000 | 1001 | r/w | DMA CH6 HIGH PAGE REGISTER | CPU/PCI/ISA | DMA4=1 |
| 048Ah | 0000 | 0100 | 1000 | 1010 | r/w | DMA CH7 HIGH PAGE REGISTER | CPU/PCI/ISA | DMA4=1 |
| 048Bh | 0000 | 0100 | 1000 | 1011 | r/w | DMA CH5 HIGH PAGE REGISTER | CPU/PCI/ISA | DMA4=1 |
| 04D0h | 0000 | 0100 | 1101 | 0000 | r/w | INT-1 EDGE/LEVEL CONTROL REGISTER | CPU/PCI/ISA | PIC=1 |
| 04D1h | 0000 | 0100 | 1101 | 0001 | r/w | INT-2 EDGE/LEVEL CONTROL REGISTER | CPU/PCI/ISA | PIC=1 |
| 0CF9h[4] | 0000 | 1010 | 1111 | 1001 | r/w | TURBO CONTROL REGISTER | CPU | TRC=1 |

FIGURE 5F

| CONFIGURATION OFFSET | REGISTER | REGISTER ACCESS | BUS MASTER | LINK CODING |
|---|---|---|---|---|
| 00h-08h [1] | PSC | — | — | — |
| 009h-3Fh [3] | RESERVED | — | — | — |
| 40h [1] | PSC | — | — | — |
| 41h-43h [3] | RESERVED | — | — | — |
| 44h [1] | PSC | — | — | — |
| 45h-47h [3] | RESERVED | — | — | — |
| 48h-49h [1] | PSC | — | — | — |
| 4A49h-4Bh [3] | RESERVED | — | — | — |
| 4Ch | ISA CONTROLLER RECOVERY TIMER | R/W | CPU ONLY | ISATIM=1 |
| 4Dh | PREV | R/W | CPU ONLY | ISATIM=1 |
| 4Eh [2] | XBUS CHIP SELECT ENABLE A | R/W | CPU ONLY | ISATIM=1 |
| 4Fh [3] | RESERVED | — | — | — |

FIGURE 5G

| CONFIGURATION OFFSET | REGISTER | REGISTER ACCESS | BUS MASTER | LINK CODING |
|---|---|---|---|---|
| 50h[1] | PSC | — | — | — |
| 51h[3] | PSC | — | — | — |
| 52h-53h[1] | PSC | — | — | — |
| 54h-55h[3] | RESERVED | — | — | — |
| 56h-57h[1] | PSC | — | — | — |
| 58h[3] | RESERVED | — | — | — |
| 59h-64h[1] | PSC | — | — | — |
| 65h[3] | RESERVED | — | — | — |
| 66h | PIRQ0 ROUTE CONTROL | R/W | CPU ONLY | PIRQ=1 |
| 67h | PIRQ1 ROUTE CONTROL | R/W | CPU ONLY | PIRQ=1 |
| 68h[2] | DRAM MEMORY HOLE | R/W | CPU ONLY | MEMH=1 |
| 69h[2] | TOP OF MEMORY | R/W | CPU ONLY | MEMH=1 |

FIGURE 5H

| CONFIGURATION OFFSET | REGISTER | REGISTER ACCESS | BUS MASTER | LINK CODING |
|---|---|---|---|---|
| 6Ah-6Fh[3] | RESERVED | — | — | — |
| 70h[1] | PSC | — | — | — |
| 71h-9Fh[3] | RESERVED | — | — | — |
| A0h | SMI CONTROL (SMICNTL) | R/W | CPU ONLY | SMI=1 |
| A1h | RESERVED | — | — | — |
| A2h-A3h | SMI ENABLE (SMIEN) | R/W | CPU ONLY | SMI=1 |
| A4h-A7h | SYSTEM EVENT ENABLE (SEE) | R/W | CPU ONLY | SEE=1 |
| A8h | FAST OFF TIMER | R/W | CPU ONLY | FOT=1 |
| A9h-ABh[3] | RESERVED | — | — | — |
| AAh-ABh | SMI REQUEST (SMIREQ) | R/W | CPU ONLY | SMI=1 |
| ACh | CLOCK THROTTLE STPCLK# LOW TIMER | R/W | CPU ONLY | STPCLK=1 |
| ADh | RESERVED | — | — | — |
| AEh | CLOCK THROTTLE STPCLK# HIGH TIMER | R/W | CPU ONLY | STPCLK=1 |
| AFh-FFh[3] | RESERVED | — | — | — |

METHOD AND APPARATUS FOR DECODING AND RECODING OF ADDRESSES

This is a continuation of application Ser. No. 08/210,346, filed Mar. 18, 1994, now abandoned.

FIELD OF THE INVENTION

The present invention relates to the field of computer systems. More particularly, the present invention relates to the decoding of addresses.

BACKGROUND OF THE INVENTION

In the fabrication of semiconductor components, die size of the component plays a large role in the fabrication costs of the component. Larger die sizes leads to higher fabrication costs because the number of components produced from a given wafer size decreases with increasing die size. Larger die sizes also result in higher fabrication costs because the yield as measured by percentage of acceptable components decreases with increasing die size due to the higher incidence of defects associated with the larger die sizes.

Two factors contribute to the selection of a die size for a semiconductor component. The first factor is the number of pins required for the component. The number of pins required bears a direct correlation with the number of signals transmitted to and from the component. The second factor is the number of gates required in fabricating the component which bears a direct relationship with the number of functions performed by the component. Sometimes the die size as dictated by the required number of pins matches the die size as dictated by the required number of gates. In this circumstance, the particular die size is fully utilized. However, in other situations, the die size as dictated by the required number of gates exceeds the die size as dictated by the required number of pins. When this situation occurs, it would be extremely beneficial to have the ability to "transfer" functions from one component to another to better match the number of gates to number of pins. When this transfer occurs, the required number of gates decreases for the transferer component and a lower die size can be utilized.

Moreover, with many computer systems, the system transmits an address through a first component to a second component. When the first component receives the address, it decodes the address. It then retransmits the address to the second component. The second component then decodes the address a second time. The decoding of the address twice results in duplication of efforts by the two components. Thus, it would be extremely beneficial to have the ability to reduce the amount of duplicative decoding. When this reduction of duplicative decoding occurs, the system can achieve higher performance.

One prior computer system utilized a chip select line between a first component and a second component to indicate that the second component was a destination for data. In this system, some decoding functions were transferred from one component to another and some duplicative decoding was eliminated. However, with this system, the address received by the first component and the address transmitted by the first component to the second component had the same length. In addition, the chip select information provided by the first component only indicated the component destination for data and did not specify the destination within the component. Moreover, the chip select line necessitated the addition of pins potentially resulting in an undesireable increase in die size. Consequently, the second component still had to perform a significant amount of decoding. Although, the system allowed for some transfer of decoding functions and some elimination of duplicative decoding, more of both was needed.

Thus, what is needed is a method and apparatus which allows the transfer of functions between components thereby allowing for the transfer of gates between components. What is also needed is a method and apparatus which allows for elimination of duplicative decoding to enhance computer system performance.

SUMMARY OF THE INVENTION

A novel semiconductor component is described which directs transmission of data. The component comprises of a decoder device coupled to said first memory device capable of decoding an address of said data item in a first format using the address stored in the first memory device. The component also comprises a translator device coupled to a second memory device capable of transmitting the address of the data item in a second format corresponding to said address of said data in the first format, wherein the second format contains the same information as the first format.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a table illustrating the second address format of a fourth embodiment of the present invention.

FIG. 5 is a table illustrating the address locations of a component of a fifth embodiment of the present invention.

DETAILED DESCRIPTION

A novel semiconductor component for decoding and recoding of addresses is described. In the following description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Figure 1:
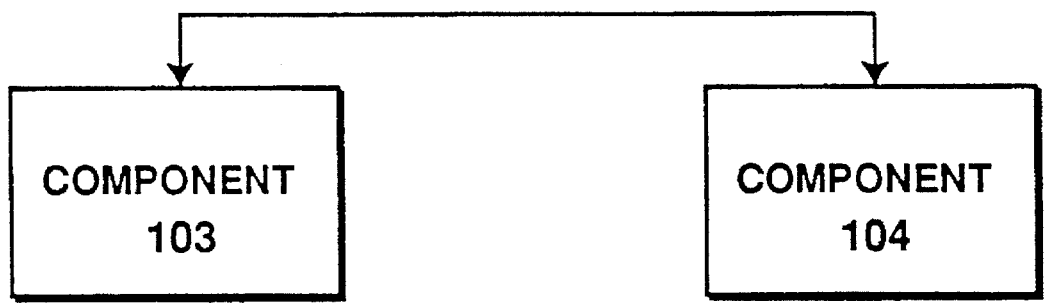
FIG. 1 is a block diagram illustrating a semiconductor component of one embodiment of the present invention.

FIG. 1 is a block diagram illustrating a semiconductor component 103 coupled to component 104. Component 103 transmits address, data, command and status signals to component 104 and also it receives address, data, command and status signals from component 104. Component 103 can transmit an address to component 104 in one of two formats. In the first format, the address is a predetermined length. Using the first format, component 103 decodes the address and determines the destination. If component 104 is the destination, component 103 transmits the address and accompanying data to component 104. Component 104 then decodes the address again and transmits the address and accompanying data to the specific destination unit within component 104. The destination unit then decodes the address again to determine the specific location within the unit which serves as the destination. It will be appreciated that the decoding operation is performed three times under the first address format. However, component 103 also has circuitry to translate an address in the first format to the second format. Under the second format, component 103 transmits a first signal to indicate that the address is in the second format. It also transmits a plurality of encoded select signals. These select signals specify the specific unit within component 104 which serves as the destination for address and data. Component 104 also transmits an address in the second format. Because component 103 indicates the specific destination unit through the encoded select signals, the portion of the address in the first format which indicates the destination unit is no longer necessary. Thus, an address in the second format no longer contains the portion which specifies the destination unit. When component 103 transmits an address in the second format, it eliminates this portion which can be high order or low order bits depending on the protocol used. It will be appreciated that an address in the second format has a smaller number of bits then an address in the first format.

When component 104 receives a transmission in the second format, it processes the encoded select signals and directs the transmission to the specific unit which serves as the destination. Because the encoded select signals already specify the destination unit, component 104 performs no decoding. When the specific destination unit receives the transmission, it decodes the truncated address in the second format and places the data in the proper register.

It will be appreciated that the second format allows logic functions to be transferred from component 104 to component 103. It will also be appreciated that the second format also results in the elimination of duplicative decoding.

Figure 2:
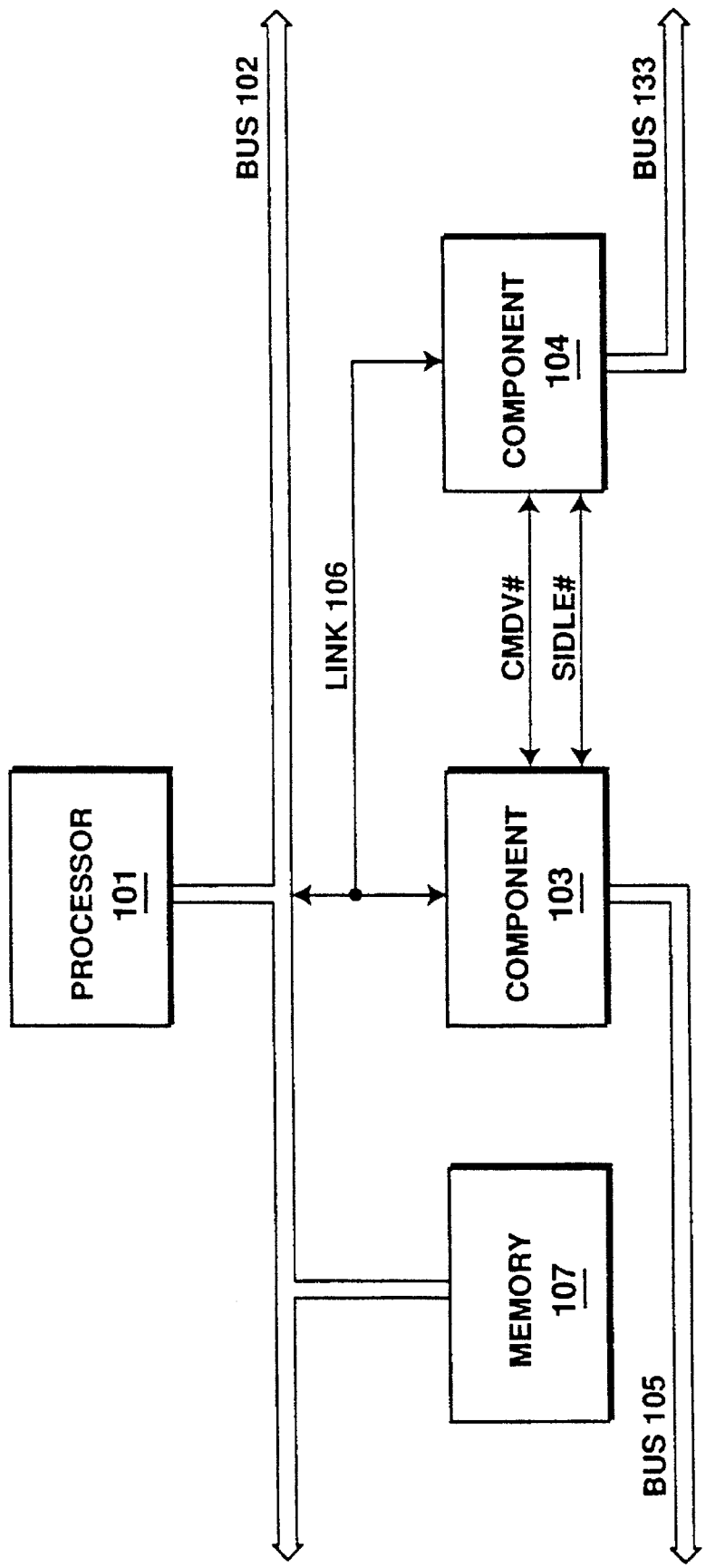
FIG. 2 is a block diagram illustrating the computer system of the second embodiment of the present invention.

FIG. 2 is a block diagram illustrating the computer system of the second embodiment of the present invention. The computer system comprises of processor 101, bus 102, memory 107, component 103, component 104, link 106, bus 105 and bus 133. Processor 101 is coupled to bus 102 and can be a central processing unit or a microprocessor. Memory 107 is also coupled to bus 102 and can be a random access memory. Component 103 is coupled to bus 102 and can be a bus controller for bus 105. Similarly, component 104 is coupled to component 103 by link 106 and can also be a bus controller controlling bus 133. Component 103 and component 104 are coupled by a command indication line (CMDV#) and a completion indication line (SIDLE#). Processor 101 can transmit address, data, command and status signals to component 103 and can also receive address, data, command and status signals from component 103. Similarly, component 103 can transmit address, data, command and status signals to component 104 and receive address, data, command and status signals from component 104. In this embodiment, other components can transmit through component 103 or component 104 as the case may be. For example, a component on bus 105 transmitting to a component on bus 133 first transmits to component 103. Component 103 then retransmits the signals to component 104 and component 104 retransmits the signals to the component on bus 133 over bus 133.

Figure 3A:
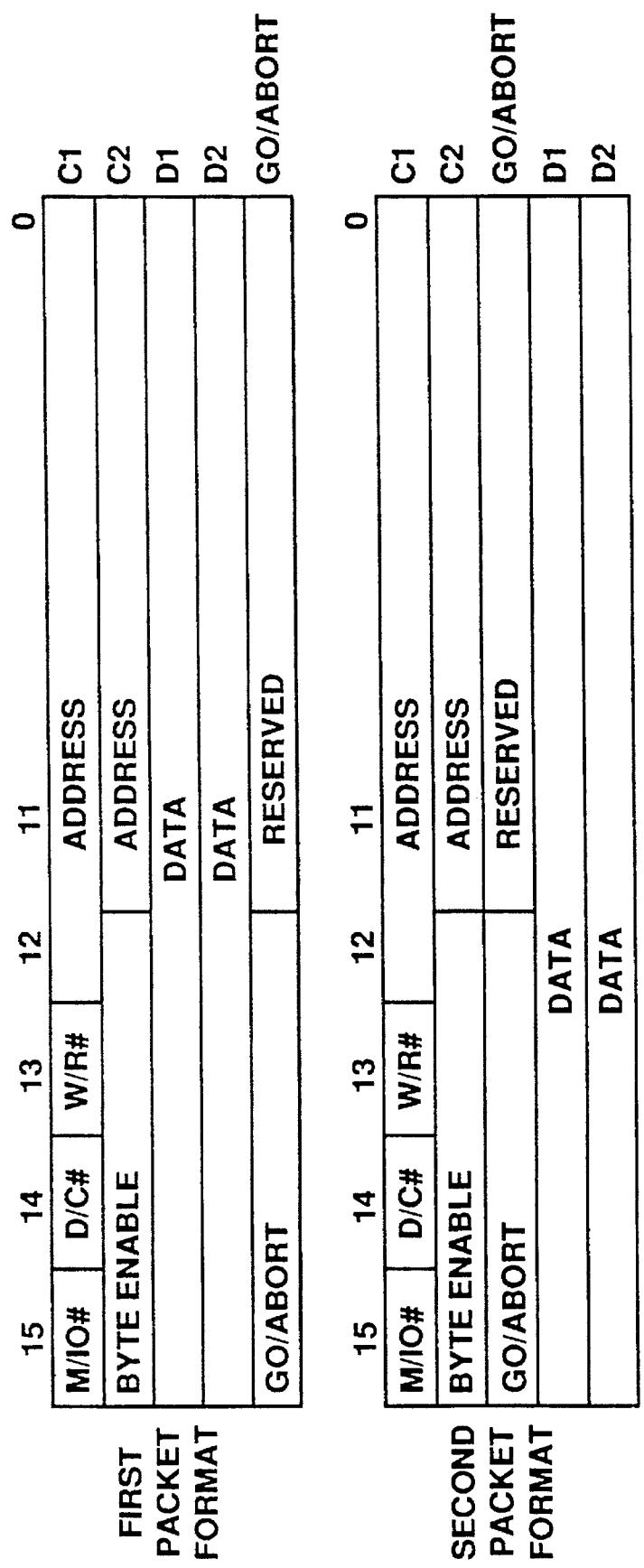
FIG. 3 is a table illustrating the protocol used in the third embodiment of the present invention.
Figure 3B:
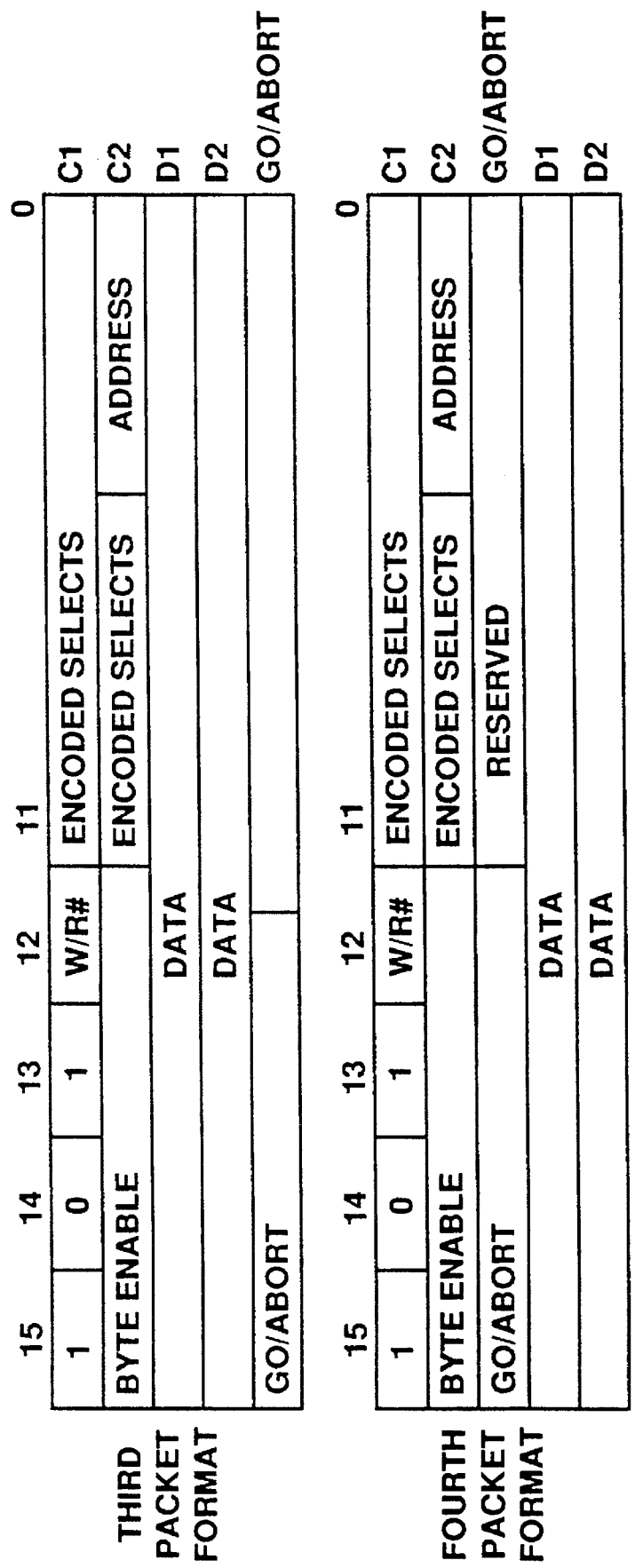

FIGS. 3A and 3B is a table illustrating the protocol used in the third embodiment of the present invention. In this embodiment, link 106 comprises of 16 separate lines and thus can transmit 16 bits at one time. In this protocol, command, status, address and data signals are transmitted serially over link 106 in five separate packets. In this manner, individual lines in link 106 can transmit command, status, address and data signals. The first packet format shown in FIG. 3A is the protocol used for a write cycle conforming to the first format. The first packet format is used when the destination is a component on bus 133 other than component 104. In the first packet, the C1 packet, the first thirteen lines (0:12) are used to transmit address signals to controller 104. Line 13 is used to transmit a W/R# signal which indicates whether the cycle is a read or write cycle. Line 14 is used to transmit a D/C# signal which indicates whether the write cycle contains data or control signals. Line 15 of the first packet is used to transmit a M/IO# signal which indicates whether the write cycle is to memory or input-output component. The second packet, the C2 packet, is transmitted after the C1 packet. In the C2 packet, the first twelve lines (0:11) are used to transmit address signals. The remaining four lines (12:15) are used to transmit byte enables. Byte enable signals indicate active bytes during read and write cycles. When the byte enable is active for a particular byte, the data transmitted is valid. In the third packet, the D1 packet, all sixteen lines (0:15) is used to transmit data. Similarly, in the fourth packet, the D2 packet, all sixteen lines are used to transmit data. In the fifth packet, the first twelve lines (0:11) are reserved. The remaining four lines (12:15) are used to transmit the GO command or the ABORT command. FIG. 3A also illustrates the second packet format protocol used when controller 103 or processor 101 initiates a read cycle over link 106. The read cycle protocol is similar to the write cycle protocol. Controller 103 transmits the M/IO# signal, D/C# signal, W/R# signal, byte enables, and address signals in the same manner as described above. However, the third packet instead of being a data packet, contains the GO command or the ABORT command. The fourth packet is a data packet, the D1 packet with all sixteen lines (0:15) transmitting data signals from controller 104 to controller 103. The fifth packet is also a data packet, the D2 packet with all sixteen lines (0:15) transmitting data to controller 103 from controller 104.

The third packet format shown in FIG. 3B is the protocol used for a write cycle conforming to the second format. The second format is used when controller 104 is the destination for the information. Under the third packet format, the first packet is a command packet, the C1 packet. Controller 103 transmits encoded selects over the first twelve lines (0:11). Controller 103 transmits a W/R# signal over the thirteenth line and transmits a 101 over the last three lines (13:15) respectively. The second packet is also a command packet, the C2 packet. Controller 103 transmits address signals over the first six lines (0:5). It also transmits encoded selects over the next six lines (6:11) and transmits byte enables over the last four lines (12:15). The encoded selects indicate actual destination in terms of the specific unit in controller 104. The third and fourth packets, the D1 and D2 packets respectively are used to transmit data signals. Controller 103 transmits data signals over all sixteen lines (0:15). The fifth packet is used to transmit a GO or ABORT command which is transmitted over four lines (12:15).

FIG. 3B also illustrates the fourth packet format used when controller 103 or processor 101 initiates a read cycle over link 106 conforming to the second format. The read cycle protocol of the second format is similar to the write cycle protocol of the second format. Controller 103 transmits the 101 signal, W/R# signal, byte enables, encoded selects and address signals in the same manner as described above. However, the third packet instead of being a data packet contains the GO command or the ABORT command. The fourth packet is a data packet, the D1 packet with all sixteen lines (0:15) transmitting data signals to controller 104. The fifth packet is also a data packet, the D2 packet with all sixteen lines (0:15) transmitting data to controller 104.

Under the forth packet format protocol, when controller 104 instead of controller 103 initiates a read cycle or a write cycle, the format is similar to the read cycle of the second packet format and the write cycle of the first packet format described above with the exception that the packet containing the GO or ABORT command does not exist. As such, a read or write cycle initiated by controller 104 only has four packets instead of five packets.

FIG. 4 is a table illustrating the second address format of a fourth embodiment of the present invention. In the first packet, the C1 packet, bit 15 is a binary 1, bit 14 is a binary 0, and bit 13 is a binary 1. The 101 signal is an indication that the second address format is being used by controller 103. Bit 12 indicates whether the cycle is a read or a write cycle (W/R#). Bit 11 is an encoded select for the Non Maskable Interrupt Unit (NMI). Bit 10 is the encoded select for the 8259 (x2) to Programmable Interrupt Controller (PIC). Bit 9 is the encoded select for the 8254 Counter Timer (T0). Bit 8 is the encoded select for the Direct Memory Access Reserve Page Registers (DMAR). Bit 7 is the encoded select for the Direct Memory Access High Page Registers (DMA4). Bit 6 is the encoded select for the 8237 (x2) to Direct Memory Access Controller Register Set and AT Compatible Low Page Registers (DMA0). Bit 4 is the encoded select for the Advance Power Management Control and Status Port (WIO). Bit 3 is the encoded select for the Utility Bus Control Ports (XBUS). Bit 2 is the encoded select for the Industry Standard Architecture (ISA) Bridge Configuration Registers 4C*h*, 4D*h* and 4E*h* (ISATIM). Bit 1 is the encoded select for the Integrated Drive Electronic System Event Ports 1F7*h* and 177*h* (IDESEV). Bit 0 is the encoded select for the Programmable Interrupt Request Line Route Control (PIRQ).

In the second packet, the C2 packet, bits 15, 14, 13 and 12 are byte enables (BE3#–BE0#). Each byte enable indicates whether the associated byte of data is valid. BE3# corresponds to data in D31–D24. BE2# corresponds to data in D23–D16. BE1# corresponds the data in D15–D8. BE0# corresponds to data in D7–D0. Bit 11 is a encoded select for the ISA Memory Map Configuration Registers (MEMH). Bit 10 is an encoded select for the System Management Interrupt Configuration Registers (SMI). Bit 9 is an encoded select for the System Event Enable Registers (SEE). Bit 8 is an encoded select for the Fast Off Timer Configuration Registers (FOT). Bit 7 is the encoded select for the Stop Clock Timer High and Low Count Registers (STPCLK). Bit 6 is the encoded select for the Turbo Reset Control Registers (TRC). Bits 5, 4, 3, 2, 1 and 0 contain the address in the second address format.

In the third packet, the D1 packet, all sixteen bits (15:0) contain data. Similarly, in the fourth packet, the D2 packet, all sixteen bits (15:0) contain data. In the fifth packet, bits 15, 14, 13 and 12 contain the GO command or the ABORT command. A GO command is indicated by 0000h and a ABORT command is indicated by F000h.

FIGS. 5A–5I is a table illustrating the address locations of a component of a fifth embodiment of the present invention. The table lists the addresses of all of the locations in controller 104. The Link Coding column of the table indicates the specific unit of each address location. It also indicates which encoded select is asserted for each location. It will be appreciated that for each location in controller 104, only one encoded select is asserted. The other encoded selects are set to 0. In this manner, the destination unit is easily identified by controller 104. It is the unit with a corresponding encoded select set to 1. The table also lists 16 bits of address for each location. If the addresses were listed in the first address format containing the full 25 bits, the remaining 9 bits would be all zeros because the locations are all input/output ports. When an address in the 16 bit or 25 bit format is translated to the second address format of 6 bits, only the information in A7–A2 is transmitted. It will be appreciated that the address information in bits A7–A2 combined with the link coding information in the encoded selects uniquely identify all locations in the table. It will be appreciated that controller 103 can reduce the number of address bits from 25 bits in the first address format to 6 bits with encoded selects of the second address format.

Figure 6:
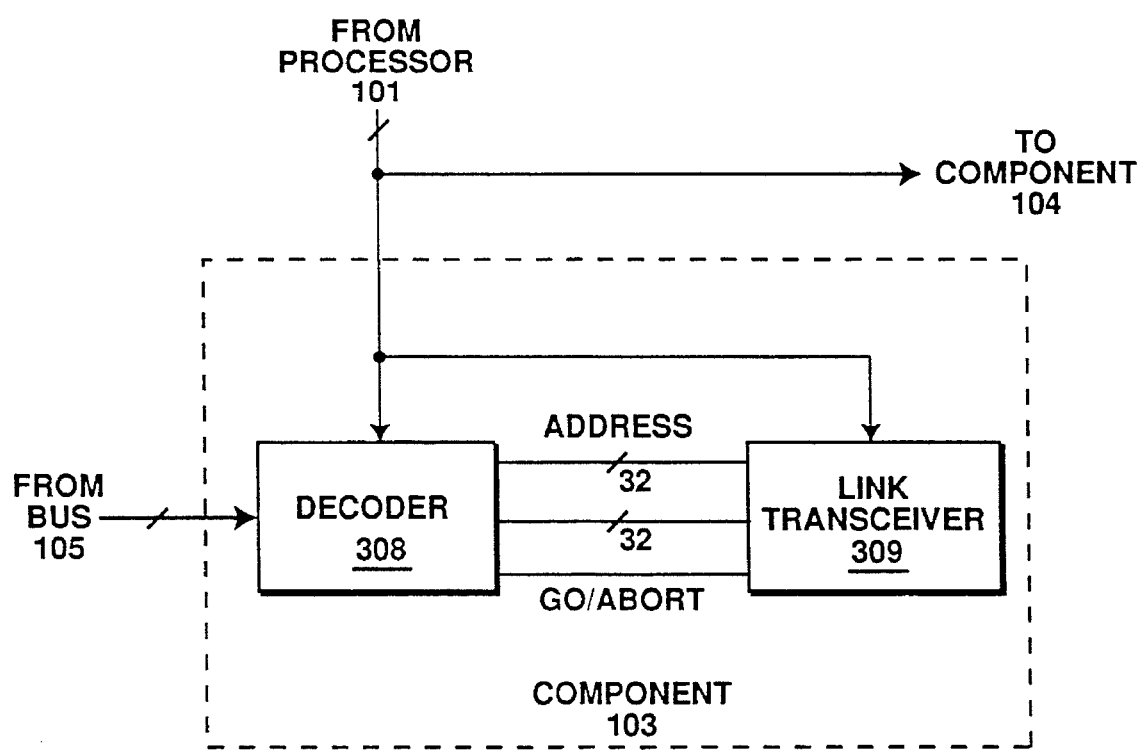
FIG. 6 is a block diagram illustrating a component of a sixth embodiment of the present invention.

FIG. 6 is a block diagram illustrating a component of a sixth embodiment of the present invention. Component 103 comprises of decoder 308 and link transceiver 309. Decoder 308 receives address, data, command and status signals from bus 105 or processor 101. Decoder 308 comprises ordinary logic devices utilizing combinational logic. Using the logic devices, decoder 308 decodes the addresses. When an address corresponds to a location in component 104, decoder 308 transforms the address in the first format into an address in the second format with encoded selects. Decoder 308 also transmits a signal indicating that the address is in the second format. Decoder 308 also has a logic device utilizing a subtractive decode to issue a GO or ABORT command. The address, data and GO or ABORT command are transmitted by decoder 308 to link transceiver 309 over internal lines. Link transceiver 309 receives the signals from decoder 308 and retransmits the signals to component 104 in 5 packets of 16 bits each. Link transceiver 309 utilizes the protocol as illustrated in FIGS. 3 and 4. In this embodiment, link transceiver 309 transmits the packets to component 104 over a shared line. The shared line not only acts as a link between link transceiver 309 and component 104, but it also acts as an address line between processor 101 and decoder 308. Component 103 can also include an arbiter and accompanying logic to arbitrate access over the shared line. It will be appreciated that link transceiver 309 can also transmit signals to component 104 on a separate line.

Figure 7:
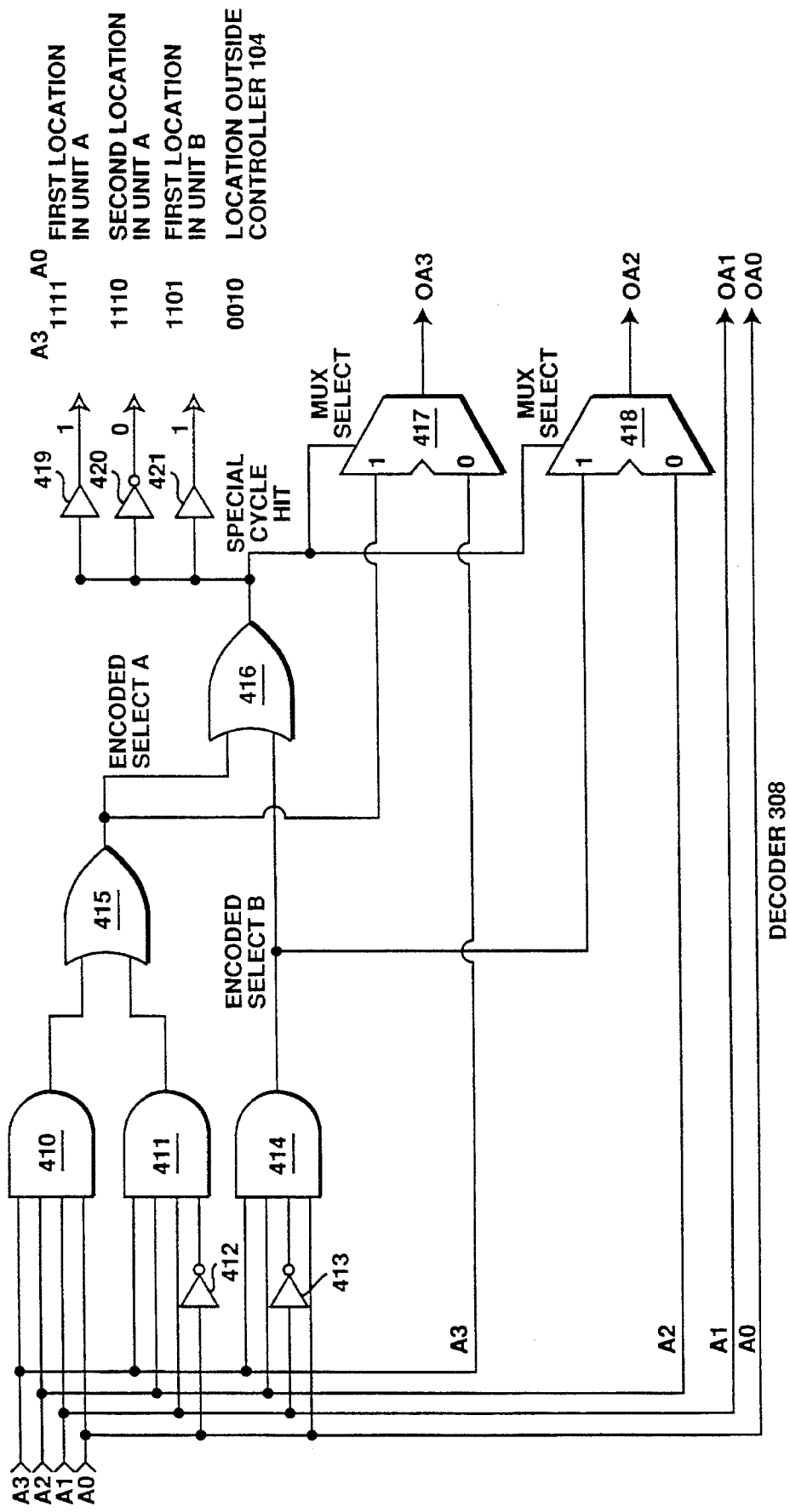
FIG. 7 illustrates the operation of a decoder of a seventh embodiment of the present invention.

FIG. 7 illustrates the operation of a decoder of a seventh embodiment of the present invention. The logic has been simplified for ease of illustration. In this example, the first two addresses, 1111 and 1110 represent addresses of locations in a first unit of controller 104. This unit is labeled Unit A. The third address, 1101 is an address of a first location in Unit B of controller 104. The fourth address, 0010 represents an address of a location outside controller 104. When decoder 308 receives an address of 1111, 1110 or 1101, the logic device transmits the address in the second address format. On the other hand when decoder 308 receives an address of 0010, the logic device transmits the address in the first address format. As described previously, the logic device generates the address in the second address format when the destination is a location in controller 104 and generates the address in the first address format when the destination is a location outside of controller 104. In this example, the addresses are received by decoder 308 through address lines A0–A3. When decoder 308 receives a 1111, AND gate 410 outputs a 1. Similarly, when decoder 308 receives a 1110 address, AND gate 411 outputs a 1. The outputs of AND gate 410 and AND gate 411 are supplied to a OR gate 415. When a 1111 address or a 1110 address is received by decoder 308, the output of either AND gate 410 or AND gate 411 will be a 1. This in turn results in a 1 for the output of OR gate 415. The output of OR gate 415 carries the signal for the encoded select of Unit A. In this manner, the encoded select bit for Unit A is set when decoder 308 receives a 1111 address or a 1110 address. Similarly, when decoder 308 receives a 1101 address, AND gate 414 outputs a 1. The encoded select bit for Unit B is then set to 1. When decoder 308 receives a 0010 address, neither the encoded select bit for Unit A nor the encoded select bit for Unit B is set.

When either encoded select bit is set, OR gate 416 outputs a 1. Inverters 419, 420 and 421 generate a 101 signal (special cycle hit) which is the indicator indicating that the address is in the second format. In addition, multiplexor 417 is activated to transpose encoded select bit for Unit A over the A3 address bit. Multiplexor 418 is also activated to transpose the encoded select bit for Unit B over the A2 address bit. In this manner, decoder 308 generates the address in the second format. It will be appreciated that the address in the second format contains two bits instead of four bits for the address in the first format. Thus, when using the second format, decoder 308 transmits a 101 signal, encoded select bit and a truncated address.

Figure 8:
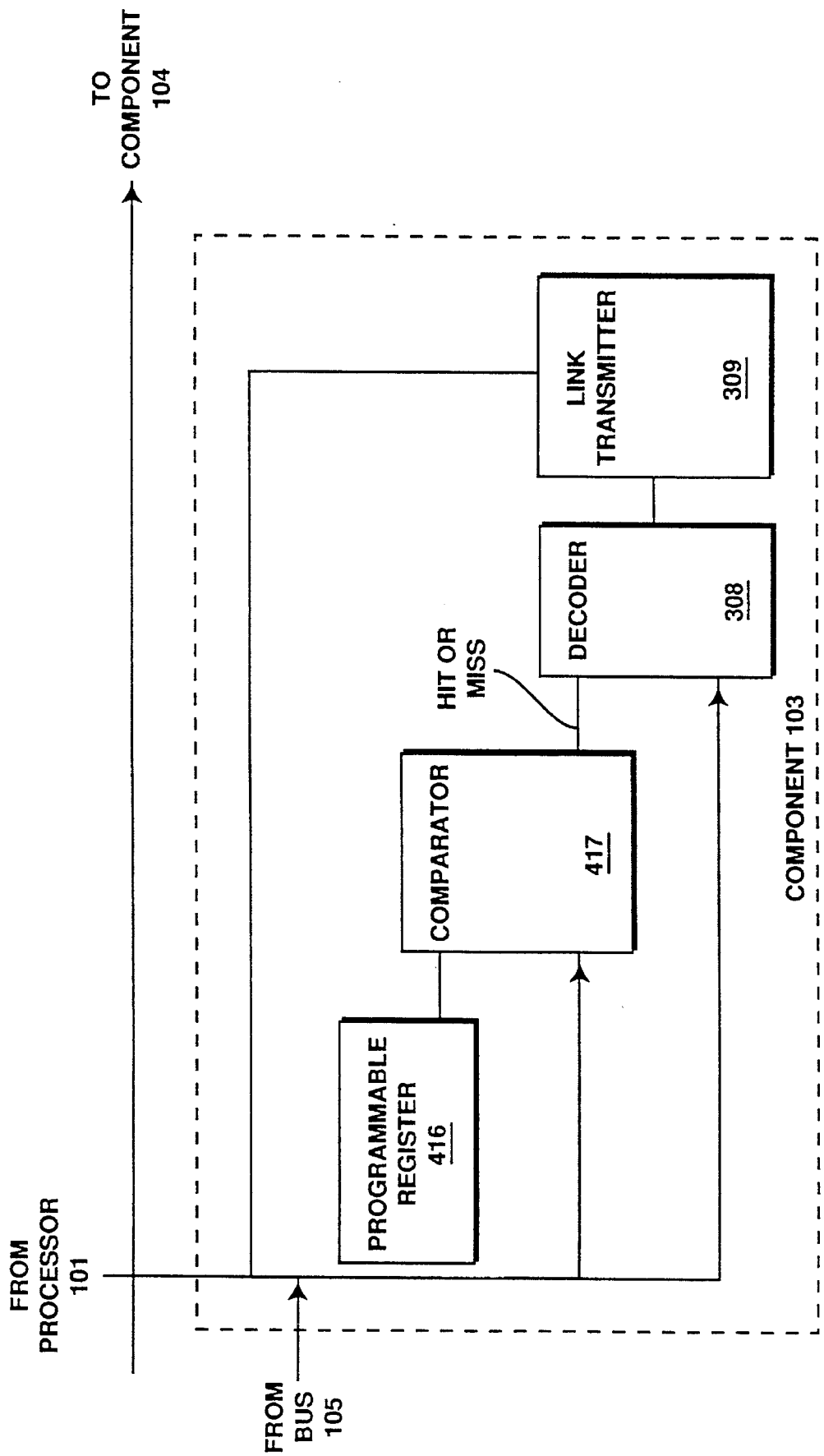
FIG. 8 is a block diagram illustrating a component of an eighth embodiment of the present invention.

FIG. 8 is a block diagram illustrating a component of an eighth embodiment of the present invention. In this embodiment, component 103 comprises of programmable register 416, comparator 417, decoder 308 and link transmitter 309. Programmable register 416 stores portions of addresses and outputs them to comparator 417. When component 103 receives an address from bus 105 or processor 101, comparator 417 performs a compare operation on the portion of the received address. When the portion of the received address matches the portion of the address in programmable register 416 a hit signal is issued to decoder 308. Decoder 308 performs a decode operation on the remaining portion of the address received from bus 105 or processor 101. Using the hit or miss signal from comparator 417, decoder 308 can determine the location represented by the address. It will be appreciated that programmable register 416 allows the address of locations to be changed.

Figure 9:
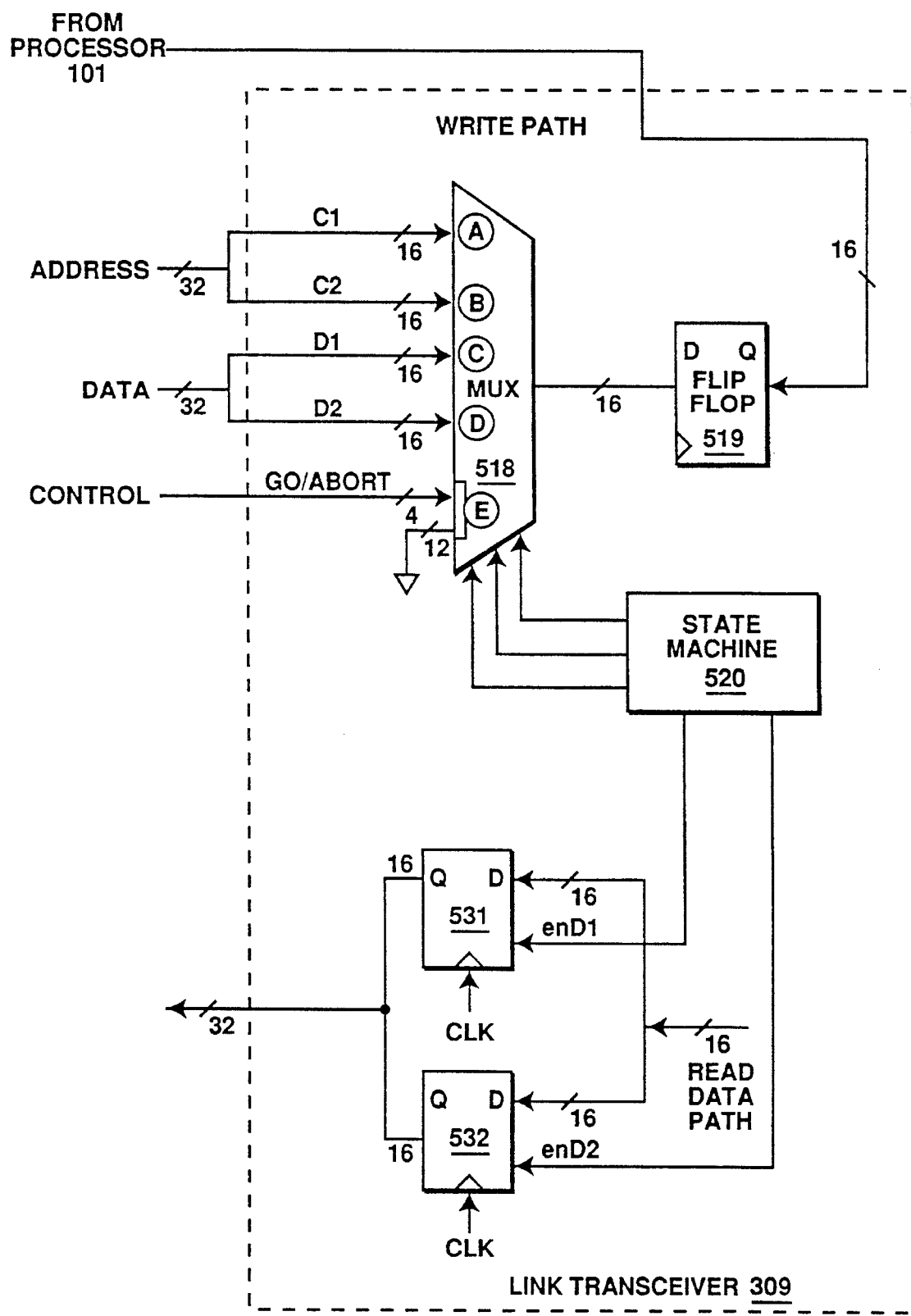
FIG. 9 is a block diagram of a link transceiver of a ninth embodiment of the present invention.

FIG. 9 is a block diagram of a link transceiver of a ninth embodiment of the present invention. In this example, for ease of illustration, one flip-flop is shown. However, in actuality, sixteen flip-flops would be used. Link transceiver 309 comprises of multiplexor 518, flip-flop 519, state machine 520, flip-flop 531 and flip-flop 532. Link transceiver 309 receives control signals from decoder 308 containing the GO or ABORT command. It also receives address and data in 32 bit format. Multiplexor 518 processes the address, data and GO or ABORT command and transforms them into five packets of 16 bits each. State machine 520 controls the operation of multiplexor 518 through internal control signals. The five packets from multiplexor 518 is stored and then transmitted by flip-flop 519 to controller 104. On a read cycle, data packets in a 16 bit from component 104 is stored in flip-flop 531 and flip-flop 532. The data is retransmitted by flip-flops 531 and 532 in a 32 bit format. State machine 520 also controls the operation of flip-flop 531 and flip-flop 532.

Figure 10:
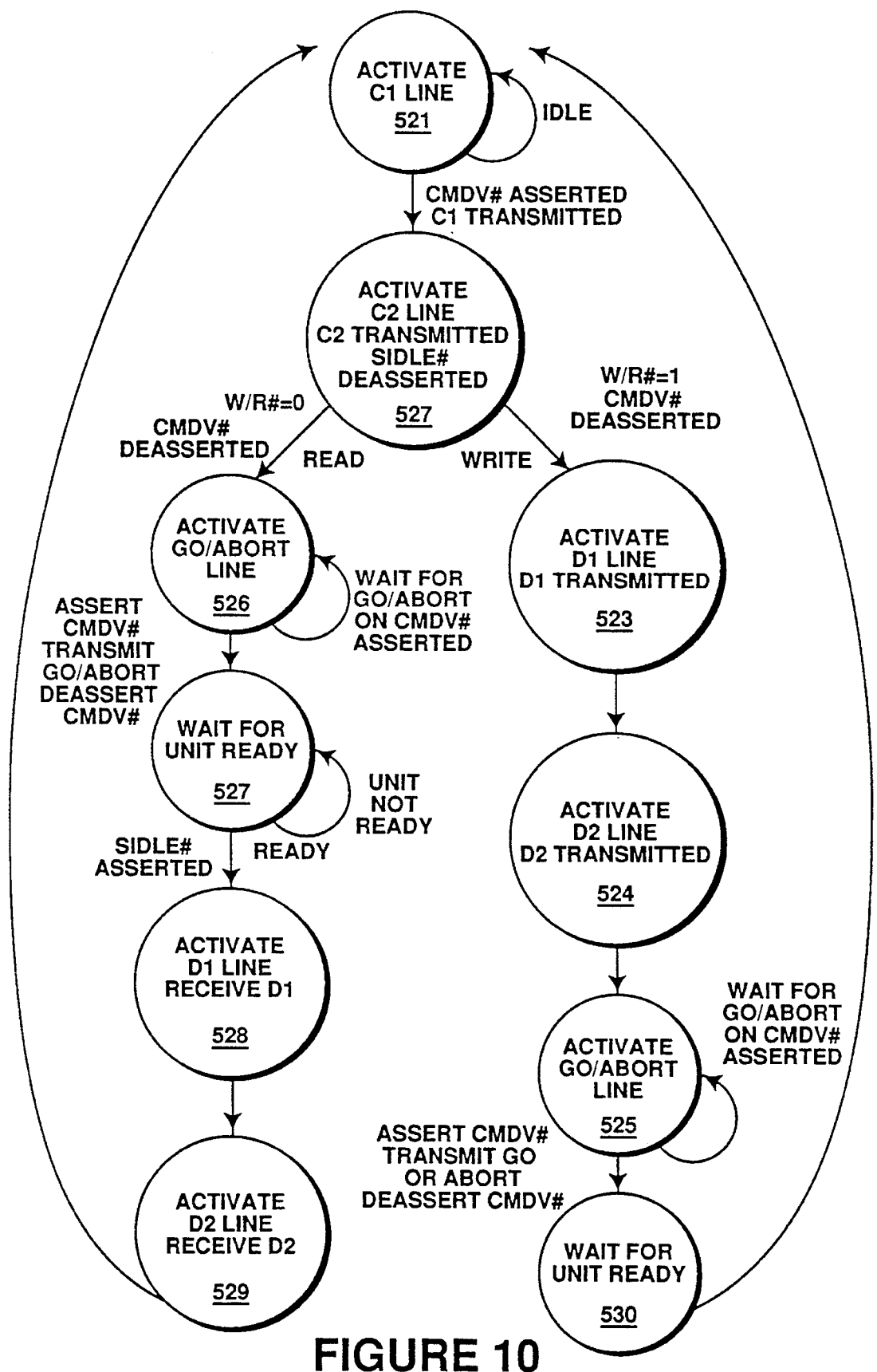
FIG. 10 is a state diagram illustrating the operation of the state machine of FIG. 9.

FIG. 10 is a state diagram illustrating the operation of the state machine 520 of FIG. 9. When the computer system powers up, state machine 520 activates the C1 line as shown in state 521. State machine 520 remains in this state until the CMDV# signal is asserted and the C1 packet is transmitted. At that point state machine 520 transitions to state 522 where it activates the C2 line. Link transceiver 309 then transmits the C2 packet and component 104 deasserts the SIDLE# signal. When the cycle is a write cycle, the W/R# bit will have a 1. Component 103 will deassert the CMDV# signal. State machine 520 reads the W/R# bit and transitions to state 523 where it activates the D1 line. Link transceiver 309 transmits the D1 packet to component 104. State machine 520 then transitions to state 524 where it activates the D2 line. Link transceiver 309 then transmits the D2 packet to component 104. State machine 520 then transitions to state 525 where it activates the GO/ABORT line. It remains in this state until it receives a GO or ABORT command when the CMDV# signal is asserted. At that point state machine 520 transitions to wait state 530 where it remains until the write cycle is completed. When the write cycle is completed, component 104 deasserts the SIDLE# signal and state machine 520 transitions back to state 521.

In a read cycle, the W/R# bit will be set to zero. State machine 520 then transitions to state 526 where it activates the GO/ABORT line. When decoder 308 transmits a GO or a ABORT command immediately after the C2 packet, state machine 520 keeps the CMDV# signal asserted. However, when decoder 308 does not immediately transmit the GO or ABORT command, state machine 520 deasserts the CMDV# signal. State machine 520 remains in state 526 until it receives a GO or an ABORT command when the CMDV# signal is asserted. State machine 520 then transitions to state 527 where it waits for component 104 to process the read cycle. When component 104 has completed the read cycle, it asserts the SIDLE# signal. State machine 520 transitions to state 528 where it activates the D1 line. Link transceiver 309 then receives the D1 packet from component 104. State machine 520 then transitions to state 529 where it activates the D2 line. Link transceiver 309 then receives the D2 packet from component 104. After link transceiver 309 receives the D2 packet, state machine 520 transitions back to state 521.

Figure 11:
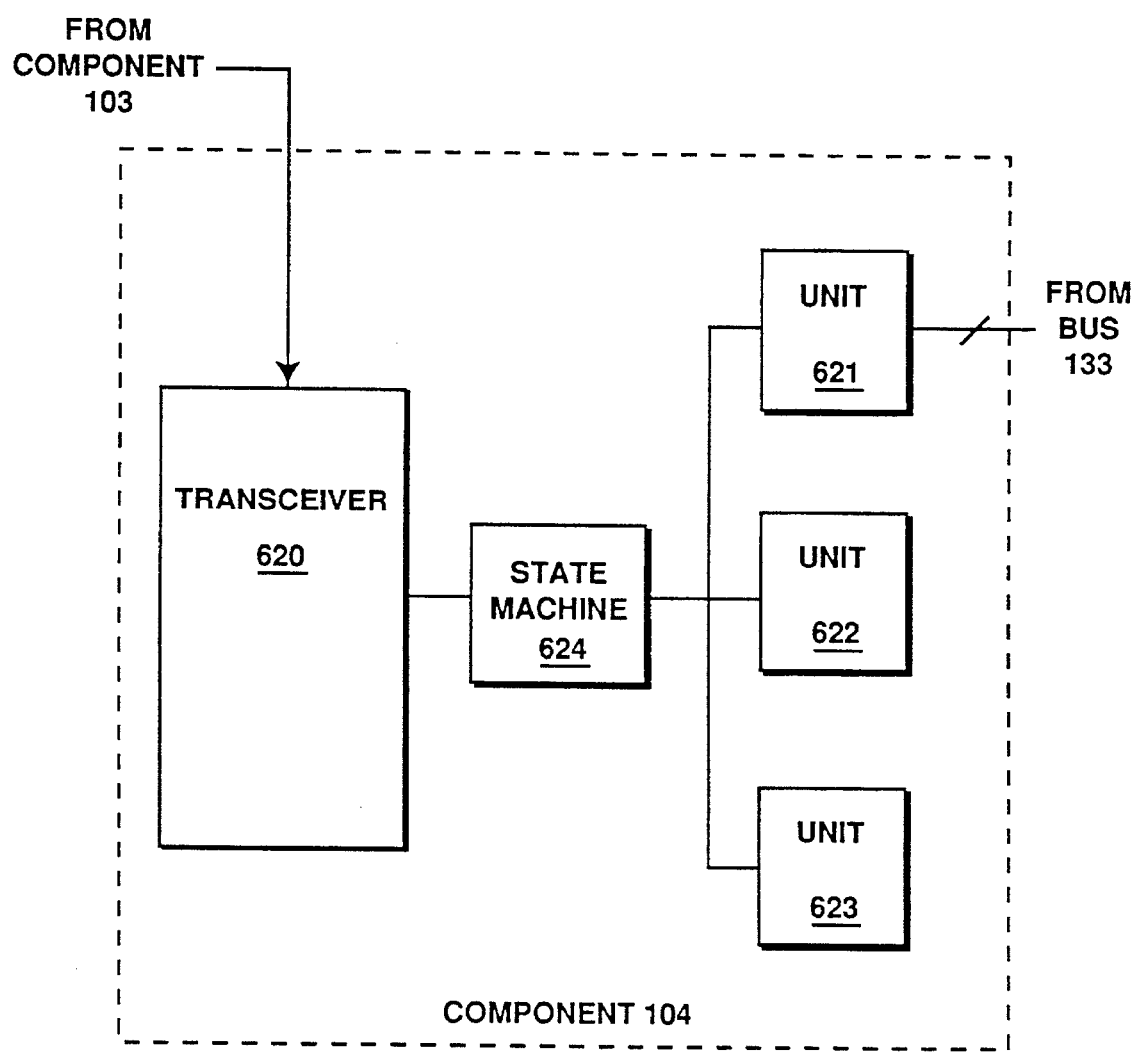
FIG. 11 illustrates a component of a tenth embodiment of the present invention.

FIG. 11 illustrates a component 104 of a tenth embodiment of the present invention. Component 104 comprises of transceiver 620, state machine 624, unit 621, unit 622 and unit 623. Transceiver 620 receives address, command, data and status signals from component 103 in five packets of 16 bits each. The packets can be in the first, second, third or fourth packet format as illustrated in FIG. 3. Transceiver 620 receives the packets from component 103 and outputs each signal on an individual line. Transceiver 620 is coupled to state machine 624 and transmits the signals to state machine 624. State machine 624 processes the encoded select bits and the 101 indicator. Using this information, state machine 624 directs the signals to unit 621, unit 622 or unit 623 as appropriate. Signals to be sent to a component on bus 133 proceed to unit 621 where the signals are transmitted on bus 133 by unit 621.

Figure 12:
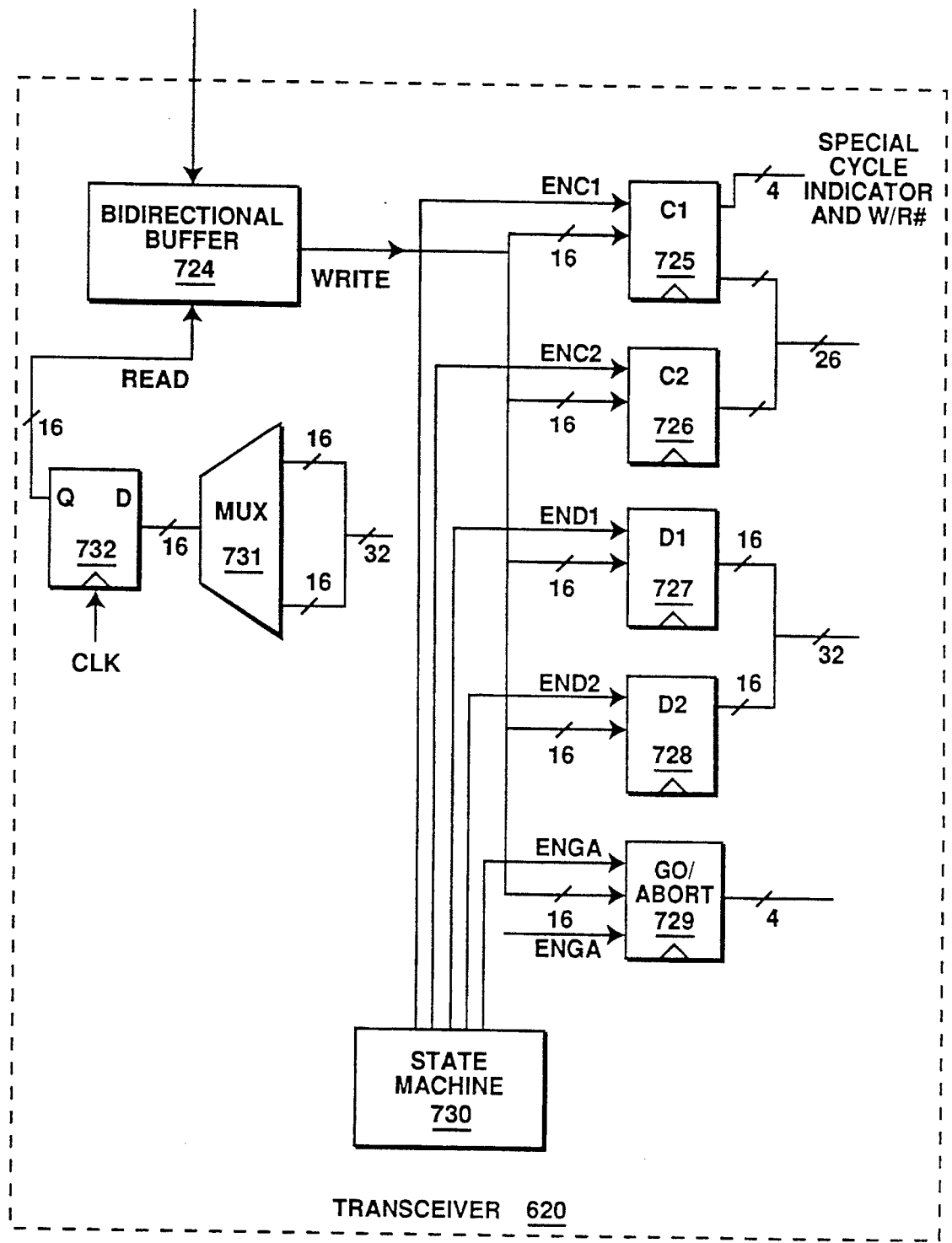
FIG. 12 is a block diagram illustrating a transceiver of a eleventh embodiment of the present invention.

FIG. 12 is a block diagram illustrating a transceiver of a eleventh embodiment of the present invention. In this example, for ease of illustration, six flip-flops are shown. However, in actuality, 84 flip-flops would be used. Transceiver 620 comprises of bi-directional buffer 724, flip-flop 725, flip-flop 726, flip-flop 727, flip-flop 728, flip-flop 729, multiplexor 731 and flip-flop 732. On a read cycle, multiplexor 731 receives data in a 32 bit format and converts the data into two packet of sixteen bits each. The packets are stored one at a time in flip-flop 732 and transmitted by flip-flop 732 to bi-directional buffer 724. Bi-directional 724 receives the data packets and transmits them to controller 103 using the correct direction. In a write cycle, bi-directional buffer 724 receives the C1, C2, D1, D2 and the GO/ABORT packets. It transmits the packets at the appropriate current for internal circuitry in transceiver 620. Flip-flop 725 stores the C1 packet. Flip-flop 726 stores the C2 packet. Flip-flop 727 stores the D1 packet. Flip-flop 728 stores the D2 packet. Flip-flop 729 stores the GO or ABORT command. State machine 730 controls the operation of flip-flops 725, 726, 727, 728 and 729 by the use of individual enable signals. State machine 730 supplies the appropriate enable signal at the proper time to allow the flip-flops to receive the proper packets. It will be appreciated that the operation of state machine 730 is similar to the operation of state machine 520 as illustrated in FIG. 10.

Figure 13:
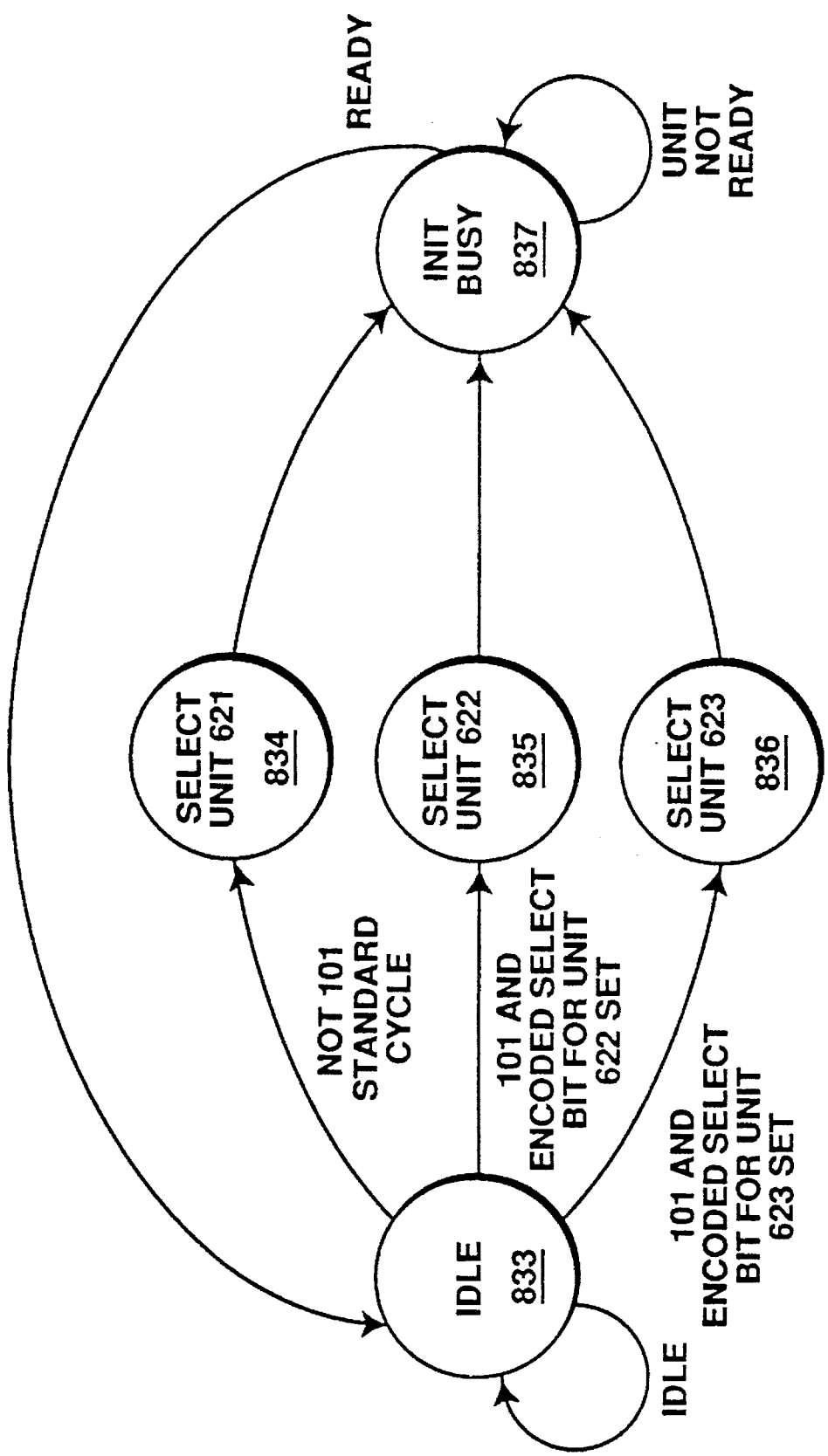
FIG. 13 is a state diagram illustrating the state machine of FIG. 11.

FIG. 13 is a state diagram illustrating the state machine of FIG. 11. When the computer system is turned on, state machine 624 powers up in idle state 833. It remains in state 833 until it receives a transmission from transceiver 620. Upon receipt of the transmission, state machine 624 examines the M/IO# bit, D/C# bit and the W/R# bit. If the bits are a 101 respectively, state machine 624 determines that the address is in the second format. It examines the encoded select bits and finds the bit that is set. If the encoded select bit for unit 622 is set, state machine 624 transitions to state 835 and selects unit 622. State machine 624 then forwards the transmission from transceiver 620. It then transitions to state 837 where it remains until the selected unit has completed its operation. On the other hand, if the encoded select bit for unit 623 is set, state machine 624 transitions to state 836 where it selects unit 623. It then forwards the transmission from transceiver 620 to unit 623 and transitions to state 837. However, if the M/IO#, D/C# and W/R# bits do not contain a 101, then state machine 624 knows that the destination of the transmission is not a location on controller 104. It also knows that the address is in the first format. State machine 624 then transitions to state 834 where it selects unit 621. It forwards the transmission from transceivers 620 to unit 621. Unit 621 retransmits the transmission over bus 133. State machine 624 transitions to state 837 where it remains until the selected unit has completed its operation. Upon completion of the operation, state machine 624 transitions back to idle state 833.

Figure 14:
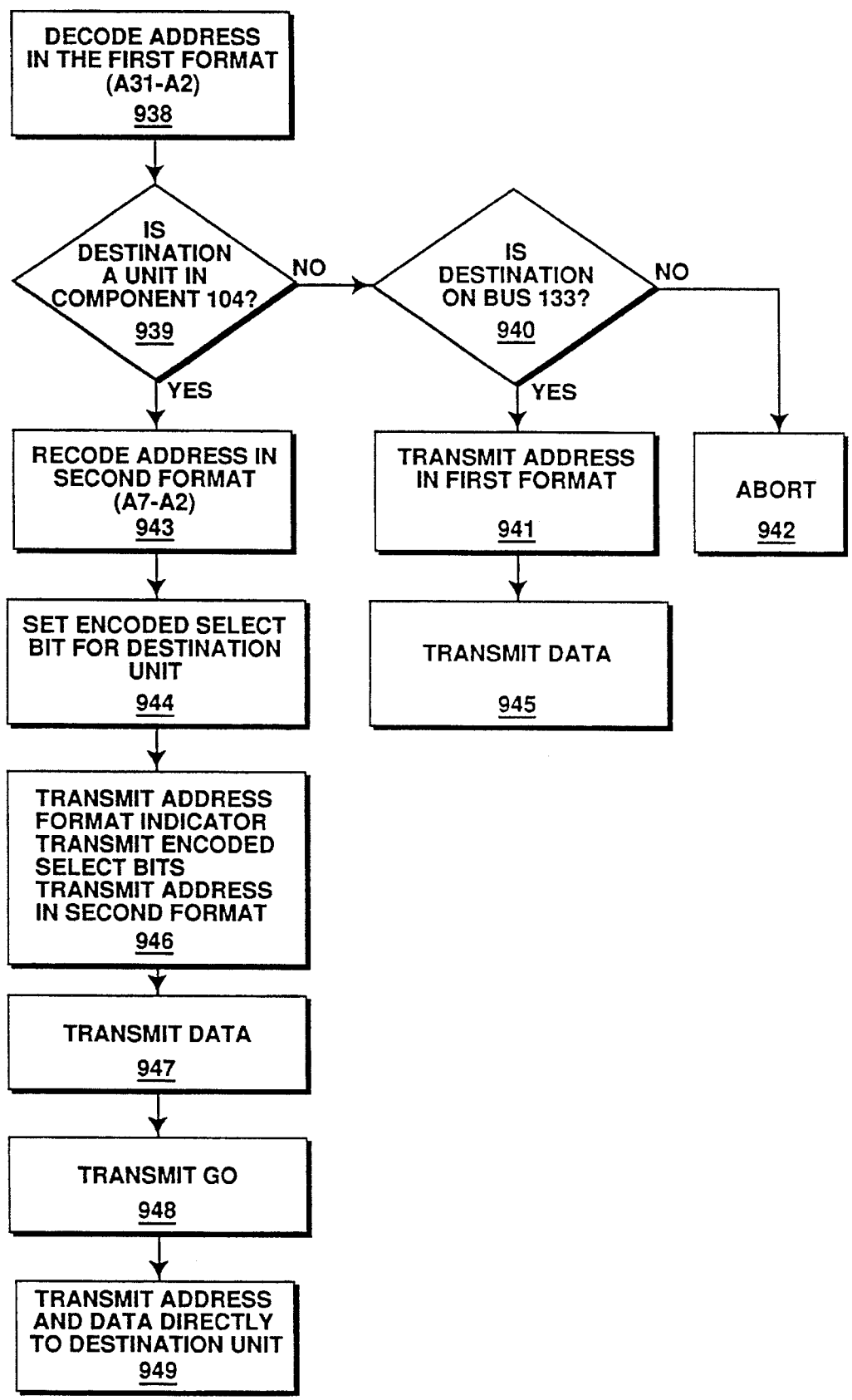
FIG. 14 is a flowchart illustrating the operation of a twelfth embodiment of the present invention.

FIG. 14 is a flowchart illustrating the operation of a twelfth embodiment of the present invention. In the first step, block 938, component 103 decodes the address in the first format (A31–A2). Component 103 then determines whether the destination is a unit in component 104 as shown in block 939. If the destination is not a unit in component 104, component 103 then determines if the destination is on bus 133 as shown in block 940. If the destination is not on bus 133 either, component 103 sends an ABORT command to component 104 as shown in block 942. When the destination is on bus 133, component 103 transmits the address in the first format as shown in block 941. It then transmits the data associated with the address as shown in block 945. For a read cycle, the ABORT command would be transmitted after the address and before the data.

On the other hand, if the destination is a unit in component 104, component 103 recodes the address in the second format (A7–A2) as shown in block 943. The address in the second format is a truncated version of the address in the first format. Component 103 then sets the encoded select bit for the particular unit which serves as the destination for data as shown in block 944. Component 103 transmits the address format indicator indicating an address in the second format. The address format indicator is a 1 for the M/IO# bit, a 0 for the D/C# bit and a 1 for the W/R# bit. Component 103 also transmits the encoded select bits and the address in the second format as shown in block 946. Component 103 then transmits the data associated with the address as shown in block 947. After transmitting the data, component 103 transmits a GO command for a write cycle as shown in block 948. After component 103 transmits the GO command, component 104 transmits address and data directly to the destination unit in controller 104 as shown in block 949. For a read cycle, component 103 transmits the GO command prior to receiving data and component 104 transmits the address directly to the destination unit.

Thus, a novel semiconductor component has been described.

What is claimed is:

1. A computer system comprising:

a bus for transferring information;

a processor coupled to the bus, the processor issuing a cycle on the bus which includes address, data, and command signals, the address signals being in a first format;

a first component coupled to the bus, the first component comprising a plurality of functional unit blocks, the address signals of the first format comprising a portion indicating a destination block from the plurality of functional unit blocks;

a second component coupled to the bus for receiving the cycle, the second component having a decoder which transforms the address signals in the first format into a second format, the address signals of the second format not comprising the portion indicating the destination block, the second component also having a transceiver for sending the address in the first or second format, data, and command signals to the first component as a series of information packets;

wherein when the series of information packets includes a format signal, the address signals are not in the first format, but are in the second format, and wherein an encoded select signal is included with the address signals in the second format indicating the destination block selected from the plurality of functional unit blocks in the first component wherein an individual bit of the encoded select signal corresponds to the destination block, such that information transfer is effectuated directly to the destination block.

2. The computer system of claim 1 wherein the cycle is a write cycle.

3. The computer system of claim 1 wherein the cycle is a read cycle.

4. The computer system of claim 1 wherein the series of information packets are 16-bits each.

5. The computer system of claim 1 wherein the destination block comprises an interrupt controller.

6. The computer system of claim 1 wherein the destination block comprises a direct memory access (DMA) device.

7. The computer system of claims 1, 2, 3, 4, 5 or 6 wherein the second component further comprises an arbitrate for arbitrating access to the bus.

8. In a computer system, a method of information transfer between first and second components coupled via a bus, the method comprising the steps of:

(a) transforming, by the first component, a cycle on the bus which includes address signals in a first format into an access cycle in which the address signals are in a second format, the access cycle including an encoded select signal indicating a destination block in the second component, wherein an individual bit of the encoded select signal corresponds to the destination block, wherein the address signals in the first format comprise a portion indicating the destination block and the address signals in the second format do not comprise the portion indicating the destination block;

(b) issuing, by the first component, the access cycle;

(c) receiving the access cycle by the second component;

(d) determining, by the second component, whether the access cycle is in the first or second format;

(e) directly transmitting, by the second component if the access cycle is in the second format, the access cycle to the destination block.

9. The method according to claim 8 further comprising the step of:

(f) placing, by said destination block, the data from the access cycle in a register.

* * * * *

UNITED STATES PATENT AND TRADEMARK OFFICE
CERTIFICATE OF CORRECTION

PATENT NO. : 5,611,054
DATED : March 11, 1997
INVENTOR(S) : Lent et al.

It is certified that error appears in the above-identified patent and that said Letters Patent is hereby corrected as shown below:

In column 1 at line 43 delete "transferer" and insert --transferor--

In column 2 at line 18 delete "said" and insert --a--

In column 2 at line 19 delete "said" and insert --a--

In column 2 at line 23 delete "said" and insert --the--

In column 2 at line 24 delete "said" and insert --the--

In column 5 at line 35 delete "101" and insert --"101"--

In column 11, at line 4 delete "arbitrate" and insert --arbiter--

Signed and Sealed this

Twenty-second Day of July, 1997

*Attest:*

BRUCE LEHMAN

*Attesting Officer*  *Commissioner of Patents and Trademarks*